(12) United States Patent
Jones et al.

(10) Patent No.: US 9,962,989 B2
(45) Date of Patent: May 8, 2018

(54) ROBOTIC SYSTEM FOR PLACING PRINTED MATERIAL INTO BOXES

(71) Applicant: Bastian Solutions, LLC, Indianapolis, IN (US)

(72) Inventors: Aaron M. Jones, Carleton, MI (US); Geoff Schreiber, Maryville, IL (US); Mark T. Curtis, Louisville, KY (US)

(73) Assignee: Bastian Solutions, LLC, Indianapolis, IN (US)

( * ) Notice: Subject to any disclaimer, the term of this patent is extended or adjusted under 35 U.S.C. 154(b) by 119 days.

(21) Appl. No.: 15/088,497

(22) Filed: Apr. 1, 2016

(65) Prior Publication Data
US 2017/0282634 A1    Oct. 5, 2017

(51) Int. Cl.
| | |
|---|---|
| *G06F 7/00* | (2006.01) |
| *G06F 19/00* | (2018.01) |
| *B43M 3/04* | (2006.01) |
| *B43M 3/02* | (2006.01) |

(52) U.S. Cl.
CPC .............. *B43M 3/04* (2013.01); *B43M 3/02* (2013.01)

(58) Field of Classification Search
None
See application file for complete search history.

(56) References Cited

U.S. PATENT DOCUMENTS

| | | | |
|---|---|---|---|
| 5,178,506 A | 1/1993 | Meschi | |
| 5,403,056 A | 4/1995 | Wallace | |
| 5,611,193 A | 3/1997 | Farrelly | |
| 5,655,355 A | 8/1997 | Ramler | |
| 5,778,640 A | 7/1998 | Prakken et al. | |
| 8,393,132 B2 | 3/2013 | Waeckerlin | |
| 8,438,817 B2 * | 5/2013 | Sankaran | B65B 5/045 53/411 |
| 8,876,100 B1 * | 11/2014 | Herrmann | B25J 9/0093 271/1 |
| 9,037,289 B2 | 5/2015 | Suyama et al. | |
| 2014/0325942 A1 | 11/2014 | Richards et al. | |

* cited by examiner

*Primary Examiner* — Yolanda R Cumbess
(74) *Attorney, Agent, or Firm* — Woodard, Emhardt, Moriarty, McNett & Henry LLP

(57) ABSTRACT

A packing system includes a conveyor configured to transport one or more containers. Two or more printers are disposed along the conveyors. The printers are configured to print printed material. Each of the printers has a tray upon which the printed material is deposited from the printer. A robotic arm is disposed proximal to the conveyor and the printers. The robotic arm has an end of arm tool configured to pick the printed material from the tray of each printer. A controller is operatively connected to the printers and the robotic arm. The controller is configured to send one or more print instructions to one or more of the printers to print the printed material. The controller is configured to instruct the robotic arm to place the printed material from the tray into the container.

26 Claims, 17 Drawing Sheets

ROBOTIC SYSTEM FOR PLACING PRINTED MATERIAL INTO BOXES

BACKGROUND

In most warehousing, manufacturing, and/or shipping environments, paperwork, such as invoices, packing slips, manuals, and other printed material, typically need to be packed within a box, carton, or other container along with the box's contents. Packing printed material within boxes can be a laborious and tedious process that is fraught with mistakes. Automated systems have been developed for packing the printed material, but these automated systems, as a practical matter, have several significant drawbacks. For example, traditional automated systems for placing printed material into boxes, such as in-line print feeder machines, require a series of belts that accumulate and queue the printed material. Typically, such machines have long queue times that require 15 seconds for the printed material to accumulate before being placed in the box. With these prior systems, the belts also create significant maintenance issues and usually have an uptime of no more than about 70%. Any time there is a failure, the long line of accumulated boxes have to be cleared before the machine, which in turn detrimentally impacts throughput and quality.

Thus, there is a need for improvement in this field.

SUMMARY

The robotic printed material box packing system described and illustrated herein uses a robot arm to load the printed material from one to three (or more) printers. Each printer has a printing tray with openings through which a sensor can sense the printed material being properly positioned within the tray. In one example, the robot is a six-axis robot with a pneumatic end-of-arm tool (EOAT) for picking up the printed material. In another example, a pincher-type EOAT is used. Above or below each printer tray is a barcode scanner that scans the printed material to make sure it is appropriate; likewise, there is a barcode scanner at the infeed of the conveyor to identify the proper box or other container. With this system, the scan queue is significantly lower which assists in the uptime of the system. To help speed up throughput and maintain printing speeds, the system prints the jobs directly to the print utility in the printer and does not send the print jobs to any type of buffer. This instantly reduces any lag during printing. Instead of the 15 seconds lag time found in the prior designs, this current design allows for a 3 second lag time with just two or three boxes in the queue.

If any failure occurs, resolution of the problem is simplified because the entire conveyor line does not have to be emptied. Moreover, the system has reprint capabilities—if the printer has an issue with printing the printed material, the robot arm can pick up the printed material and place it into a recycle bin located among the printers before reprinting the assignment from the same or different printer. By having three printers, one of the printers can be taken off-line if for example a cartridge needs to be replaced without significantly impacting throughput. When a bad piece of paper is reprinted, the robot arm removes it and places it in the recycle bin and the paper can be reprinted at the current printer or, if there is an issue with the printer, can be printed at one of the other printers. It should be appreciated this can provide greater flexibility.

The system also includes a visual monitoring system which includes a display that allows a human operator to manually (or automatically) reassign jobs and monitor the pending queue. The boxes can be monitored upstream so that the printing system can prioritize and assign jobs to specific printers once the box enters the printing area. Moreover, when any problems occur, the operator can reassign jobs and reprint using a simple drag-and-drop technique. It also allows for dynamic recovery.

The system is also be designed to use the robot to apply labels. In another variation, a second conveyor is located parallel to the main conveyor. The system can contain a gravity feed conveyor on which the robot can push the boxes onto a spur so that any rejects can be recirculated or handled in some other way. In another variation, the robot is mounted on a gantry so that it can handle a large array of multiple printers. This can be especially useful in such situations as color printing where it takes longer for the printed material to print. In still yet another variation, instead of three printers positioned on one side of the conveyor, the system includes a second set of three printers located on the other side of the conveyor for added backup.

Another aspect concerns using a tray containing a slot through which a flat piece is pushed to facilitate folding of the printed material which is subsequently packed into the box. The slot can include a second transverse slot for folding the paper a second time. Once folded, a modified robot arm with fingers can grasp the folded paper and place it into the box.

Aspect 1 concerns a packing system, comprising a conveyor configured to transport one or more containers, two or more printers disposed along the conveyors configured to print printed material, wherein each of the printers has a tray upon which the printed material is deposited from the printer, a robotic arm disposed proximal to the conveyor and the printers, wherein the robotic arm has an end of arm tool configured to pick the printed material from the tray of each printer, and a controller operatively connected to the printers and the robotic arm, wherein the controller is configured to send one or more print instructions to one or more of the printers to print the printed material, wherein the controller is configured to instruct the robotic arm to place the printed material from the tray into the container.

Aspect 2 concerns the system of any preceding aspect, wherein the robotic arm is mounted in an inverted orientation above the conveyor.

Aspect 3 concerns the system of any preceding aspect, wherein the conveyor is configured to index the containers below the robotic arm.

Aspect 4 concerns the system of any preceding aspect, further comprising a support structure from where the robotic arm hangs.

Aspect 5 concerns the system of any preceding aspect, wherein the printers are located at different areas along the conveyor, the support structure includes a gantry that at least extends between the different areas along the conveyor, and the robotic arm is moveably mounted to the gantry, wherein the robotic is configured to move along the gantry between the different areas.

Aspect 6 concerns the system of any preceding aspect, wherein the printers are oriented in an arc-shaped manner.

Aspect 7 concerns the system of any preceding aspect, wherein the printers are located on opposite sides of the conveyor.

Aspect 8 concerns the system of any preceding aspect, wherein the printers are disposed on carts that are configured to move.

Aspect 9 concerns the system of any preceding aspect, further comprising one or more guide rails positioned to guide the carts into position for the robotic arm.

Aspect 10 concerns the system of any preceding aspect, further comprising a sensor operatively connected to the controller, wherein the sensor is positioned proximal to the tray to sense the printed material when in the tray.

Aspect 11 concerns the system of any preceding aspect, further comprising a disposal bin, and wherein the controller is configured to instruct the robotic arm to place the printed material into the disposal bin when the sensor senses a deficiency in the printed material.

Aspect 12 concerns the system of any preceding aspect, further comprising a disposal chute extending from the disposal bin proximal to the robotic arm, and wherein the robotic arm is configured to place the printed material onto the disposal chute.

Aspect 13 concerns the system of any preceding aspect, wherein the tray includes a window portion through which the sensor senses the printed material in the tray.

Aspect 14 concerns the system of any preceding aspect, wherein the window portion includes one or more slots in the tray.

Aspect 15 concerns the system of any preceding aspect, wherein the controller is configured to reassign a print job to a different one of the printers when the sensor senses a deficiency in the printed material.

Aspect 16 concerns the system of any preceding aspect, further comprising a sensor operatively connected to the controller, wherein the sensor is located along the conveyor upstream from the robotic arm to identify the container before the printed material is placed in the container.

Aspect 17 concerns the system of any preceding aspect, wherein the controller is configured to assign print jobs to one or more of the printers based on the identity of the container.

Aspect 18 concerns the system of any preceding aspect, wherein the sensor includes a barcode reader.

Aspect 19 concerns the system of any preceding aspect, further comprising an input/output device operatively connected to the controller, wherein the input/output device is configured to provide a human interface to facilitate reassignment of print jobs.

Aspect 20 concerns the system of any preceding aspect, wherein the controller is configured to send one or more print jobs directly to a print utility for each printer to reduce any buffering of the print jobs at the printers to increase packing throughput of the containers.

Aspect 21 concerns the system of any preceding aspect, wherein the tray includes a folding structure that defines one or more folding slots.

Aspect 22 concerns the system of any preceding aspect, further comprising one or more folding blade systems including a folding blade and a blade actuator configured to extend the folding blade into one of the folding slots.

Aspect 23 concerns the system of any preceding aspect, further comprising a secondary conveyor, a transfer conveyor extending between the conveyor and the secondary conveyor, and wherein the controller is configured to direct any deficient ones of the containers onto the secondary conveyor via the transfer conveyor.

Aspect 24 concerns the system of any preceding aspect, wherein the robotic arm is configured to direct the deficient containers onto the transfer conveyor.

Aspect 25 concerns the system of any preceding aspect, further comprising a support structure supporting the robot arm, and wherein the tray is attached to the support structure so that the tray remains with the support structure when one of the printers associated with the tray is removed.

Aspect 26 concerns the system of any preceding aspect, wherein the printers include three or more of the printers.

Aspect 27 concerns a method comprising identifying a container on a conveyor with a sensor that is operatively connected to a controller, wherein the controller is operatively connected to a robotic arm and two or more printers, transmitting a print job from the controller to one or more designated ones of the printers customized based at least on said identifying the container, printing printed material at the designated printers, discharging the printed material from the designated printers directly into a tray associated with each of the designated printers, moving the conveyor to position the container at a location where the robotic arm is able to access the container, and packing the printed material into the container with the robotic arm by moving the printed material from the tray to the container with the robotic arm based at least on instructions sent by the controller to the robotic arm.

Aspect 28 concerns the method of any preceding aspect, further comprising detecting a deficiency in the printed material with a tray sensor positioned proximal to the tray, wherein the tray sensor is operatively connected to the controller.

Aspect 29 concerns the method of any preceding aspect, further comprising reassigning the print job to a different printer with the controller based on said detecting the deficiency.

Aspect 30 concerns the method of any preceding aspect, further comprising discarding the printed material with the robotic arm based on said detecting the deficiency.

Aspect 31 concerns the method of any preceding aspect, further comprising receiving instructions at the controller from a human operator via an input/out device, and reassigning the print job based on said receiving the instructions.

Aspect 32 concerns the method of any preceding aspect, further comprising monitoring upstream activity of the conveyor with a sensor operatively connected to the controller, and reassigning the print job with the controller based on the upstream activity.

Aspect 33 concerns the method of any preceding aspect, wherein said transmitting the print job includes directly transmitting the print job to the print utility for the printer to reduce any buffering of the print job at the printer to increase packing speed of the printed material into the container.

Aspect 34 concerns the method of any preceding aspect, further comprising directing deficient containers onto a transfer conveyor with the robotic arm.

Aspect 35 concerns the method of any preceding aspect, further comprising folding the printed material with a folding structure of the tray before said packing the printed material.

Further forms, objects, features, aspects, benefits, advantages, and embodiments of the present invention will become apparent from a detailed description and drawings provided herewith.

DESCRIPTION OF THE SELECTED EMBODIMENTS

Figure 1:
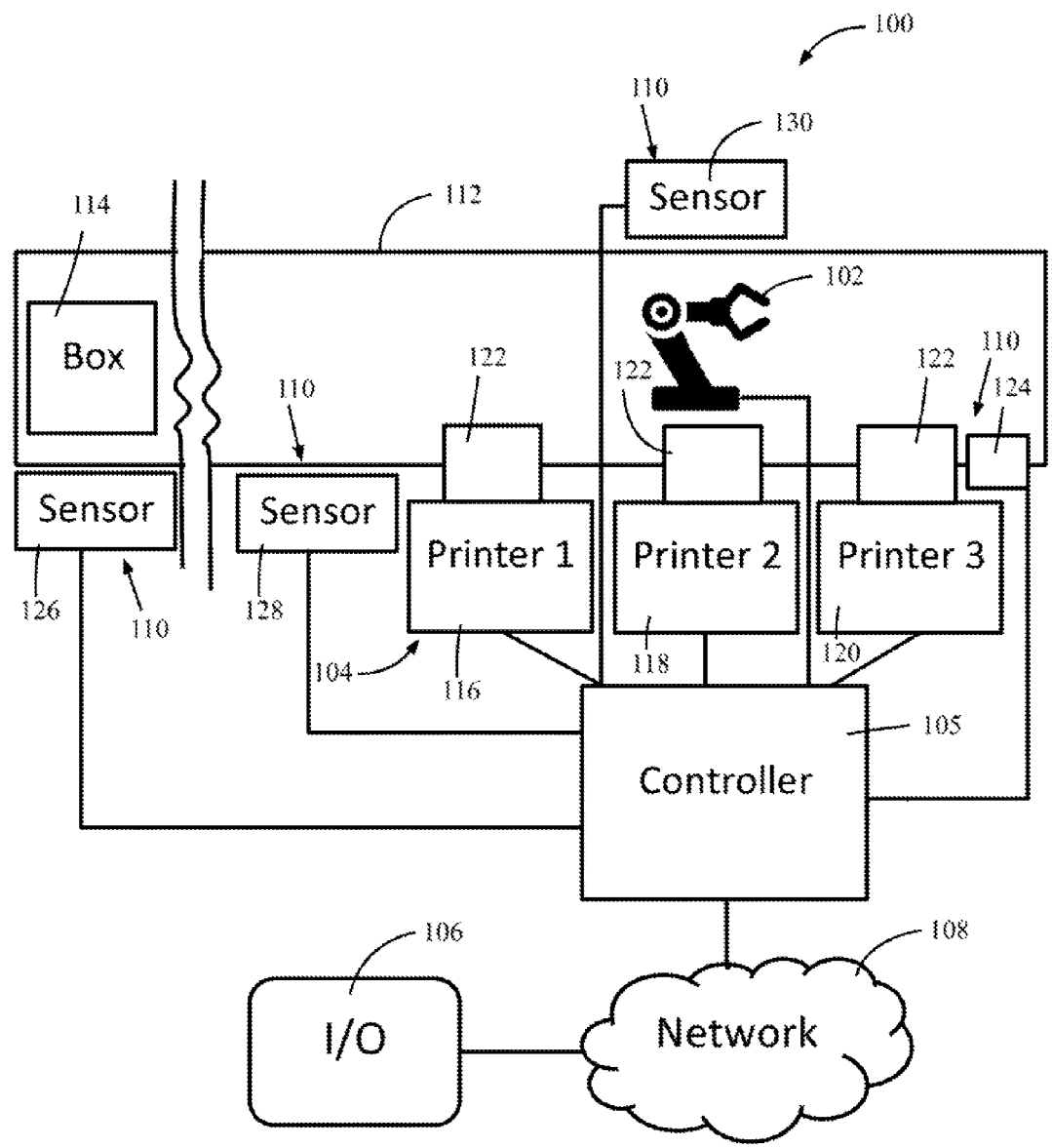
FIG. 1 is a block diagram of a packing system for packing printed material from printers into boxes, envelopes, or other containers.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

FIG. 1 is a block diagram of one example of a packing system 100 that is configured for placing printed material into boxes or other types of containers, such as envelopes, packages, bags, and the like. As shown, the system 100 includes a robotic arm 102, one or more printers 104, and a controller 105 for controlling the operation of the robotic arm 102 and the printers 104. Although FIG. 1 only shows one robotic arm 102, it should be recognized that the packing system 100 in other examples can include more than one robotic arm 102. The controller 105 can be operatively connected to the other components of the system 100 via wired and/or wireless connections. An input/output (I/O) device 106, which allows a user to interface with the controller, is operatively coupled to the controller 105 via a network 108. The I/O device 106 in one example is in the form of a computer with a touch screen that allows the operator to interact with the components of the packing system 100, but other types of I/O devices 106 can be used, such as cell phones, laptop computers, and dedicated terminals, just to name a few nonlimiting examples. In another variation, the I/O device 106 is directly incorporated into the controller 105. The system 100 further includes one or more sensors 110 that are used to monitor the operation of the various components and items that interact with the system 100. As shown, the printers 104 are disposed along a conveyor 112 that carries one or more containers 114. In the illustrated example, the containers 114 include boxes, and for the sake of brevity, the terms "boxes" and "containers" will be used interchangeably when referring to reference numeral 114. The robotic arm 102 is disposed above the conveyor 112 and is configured to pick the printed material printed by the printers 104 and place it into the boxes 114.

In the illustrated example, the system 100 includes three printers 104, but it is contemplated that the system 100 in other examples can include more or less printers 104. As shown, the printers 104 include first 116, second 118, and third 120 printers. By having more than one printer 104 from which the robotic arm 102 is able to pick printed material, the system 100 has sufficient throughput to pick and pack the printed material in an efficient manner. Moreover, the multiple printers 104 provide backups in case one of the printers 104 fails. In addition, the multiple printers 104 allow greater flexibility in the printed material that can be packed. For instance, one of the printers 104 can include a color printer for printing color printed material, such as manuals or sales materials, whereas the other remaining printers 104 are black-and-white printers for printing basic paperwork, such as invoices or packing slips. Each of the printers 104 include a tray 122 upon which the printed material from the printer 104 is discharged. While only one is shown in the drawings, each of the trays 122 in other examples include sensors 110 in the form of one or more tray sensors 124 that are configured to detect if the printed material is properly placed in the tray 122. Each of the tray sensors 124 is directly or indirectly operatively connected to the controller 105. Again, FIG. 1 only illustrates one tray sensor 124, but in practice, each of the trays 122 can include one or more tray sensors 124. The controller 105, based on the signal received from the tray sensor 124, can determine whether the printed material is present for the robotic arm 102 to pick from the tray 122. If the printed material is not properly positioned within the tray 122, the controller 105 can for example take corrective action such as diverting the robotic arm 102 to a different printer 104 in order to pick up the printed material.

The sensors 110 not only include the tray sensors 124, but the sensors 110 further include one or more upstream sensors 126, which are operatively connected to the controller 105, for sensing the boxes 114 upstream from the robotic arm 102 and printers 104. In one form, the upstream sensors 126 include one or more barcode scanners that identify the box 114 that is being transported to the robotic arm 102 such that the controller 105 can schedule one or more of the printers 104 to print the printed material for the identified box 114. In one particular example, the boxes 114 have barcodes labels or otherwise display barcodes that are read by the sensors 110. In other examples, other types of identifiers such as RFID tags are used to identify the containers 114. A cell sensor 128, such as in the form of a barcode scanner, is used to identify the boxes 114 as they enter into the work area of the robotic arm 102. A robot sensor 130 detects whether the printed material has been properly placed into the box 114 as well as ensures that the robot arm 102 is operating properly. In one form, the robot sensor 130 includes a vision system, but in other examples, the robot sensor 130 includes a barcode scanner. The sensors 110 can include other types of sensors for providing information to the controller 105 in order to control the operation of the system 100. For instance, the system 100 can include downstream sensors for further processing the boxes 114 located along the conveyor 112 downstream from the robot arm 102 and printers 104. With this system 100, the printed materials can be customized for each of the containers 114. For instance, this system 100 allows to robotic arm 102 to pack customized invoices and/or packing slips based on the identity of the container 114 and/or its contents.

Figure 2:
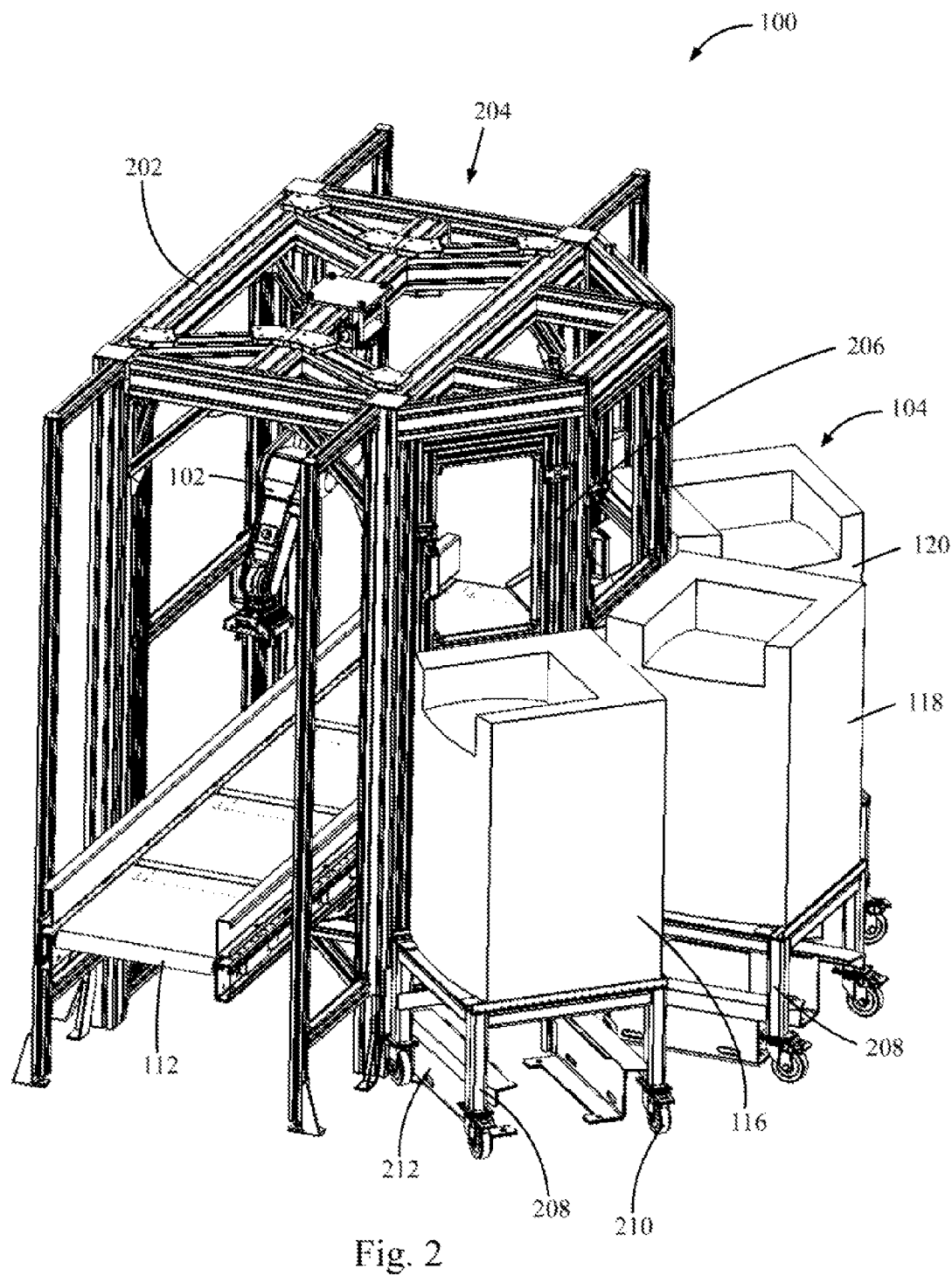
FIG. 2 is a first perspective view of the FIG. 1 packing system.
Figure 3:
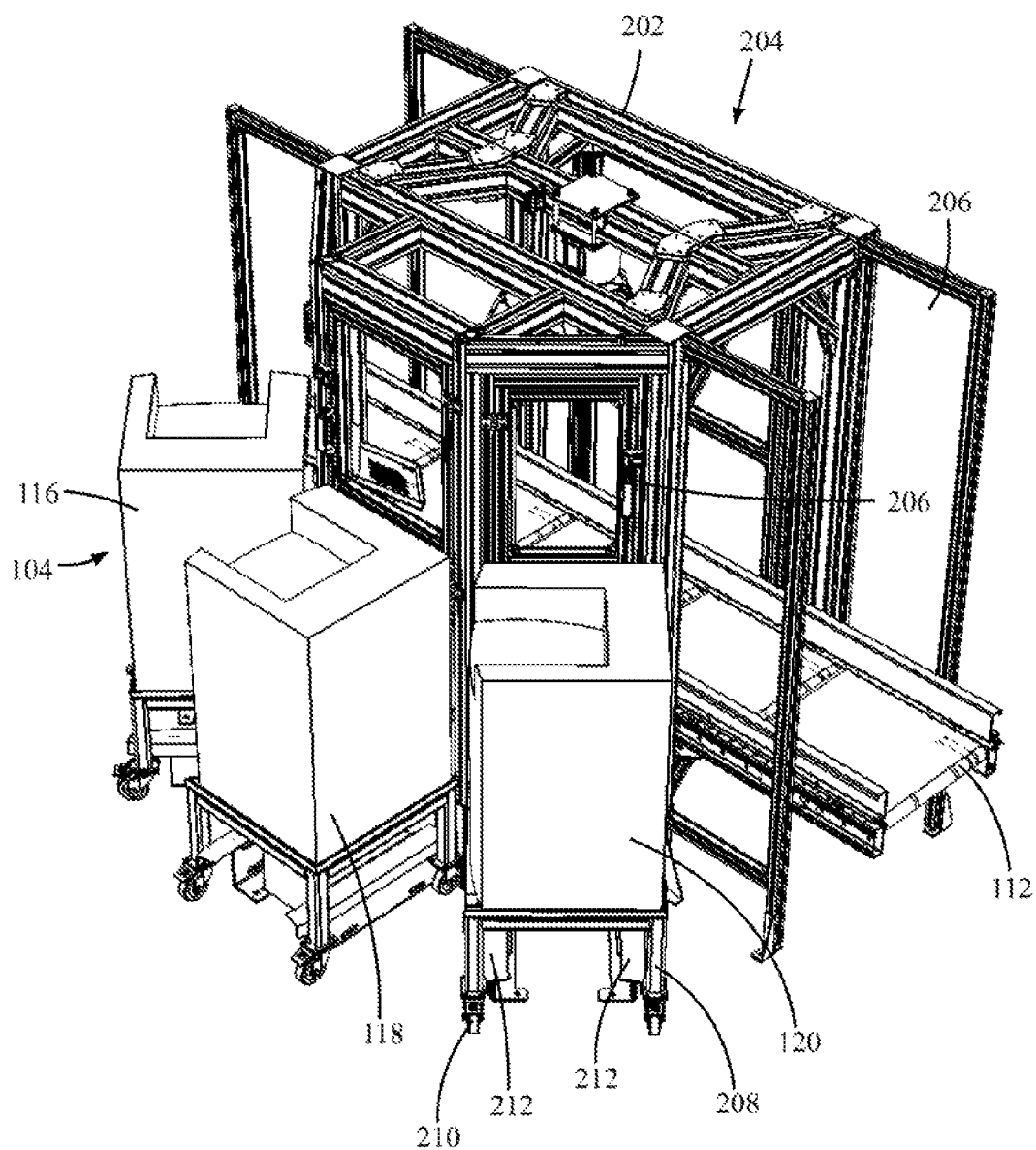
FIG. 3 is a second perspective view of the FIG. 1 packing system.
Figure 4:
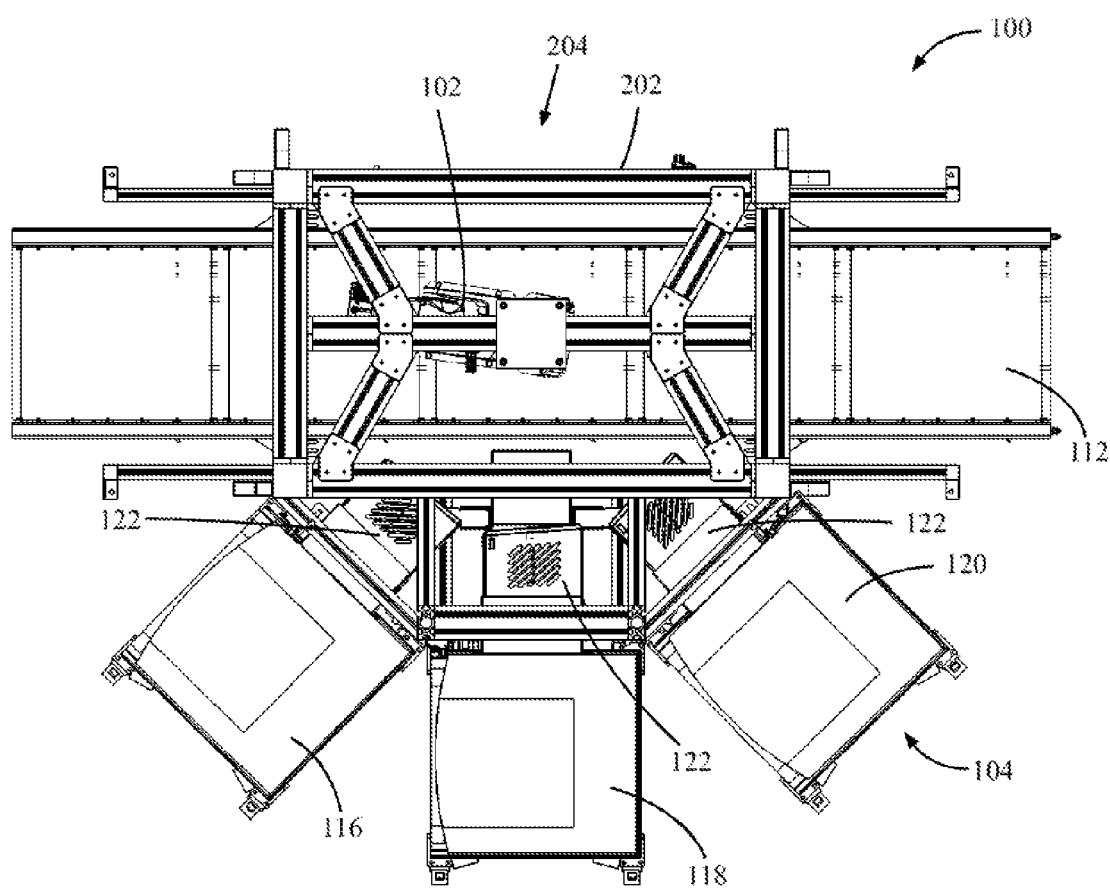
FIG. 4 is a top view of the FIG. 1 packing system.

One example of the packing system 100 will now be initially described with reference to FIGS. 2-9. FIGS. 2 and 3 respectively illustrate first and second perspective views of the packing system 100. FIGS. 4, 5, 6, and 7 show top, end, front, and back views of the system 100, respectively. As can be seen, the robotic arm 102 is mounted in an inverted manner above the conveyor 112 via a support structure 202 which in turn forms a work cell 204 for the system 100. The support structure 202 further supports the conveyor 112 and the conveyor 112 extends through the work cell 204. The support structure 202 in the work cell 204 further includes one or more protective panels 206 in order to protect personnel from being injured by the robot arm 102 during operation. With the robot arm 102 being positioned in an inverted position, the robot arm 102 is able to readily access the boxes 114 as well as the trays 122 of the printers 104. In order to fall within the reach of the robot arm 102, the printers 104 are arranged in an arc-like fashion. The printers 104 are positioned on movable carts 208 that include roller wheels 210 for aiding movement of the printers 104. By being positioned on carts 208, the printers 104 can be easily moved and removed from position for servicing and/or replacement. In order to properly position the printers 104 in the arc-shaped orientation, the system 100 includes one or more cart guide rails 212 that guide the movement of the carts 208 by engaging the legs of the carts 208 as the printers 104 are moved into the work cell 204 as well as during removal. As shown in FIG. 4, the printers 104 are arranged in an arc-shape such that the trays 122 of the printers 104 are likewise oriented in a similar manner such that the robot arm 102 is able to quickly access the trays 122 with minimal wasted movement. The trays 122 are mounted to the support structure 202 and are positioned in one example so as to gain access to the back discharge door of the printers 104. In one particular example, the printers 104 are KYOCERA brand laser printers, but other types and brands of printers can be used. With the trays 102 attached to the support structure 202, the printers 104 on the carts 208 can be easily moved and replaced.

Figure 5:
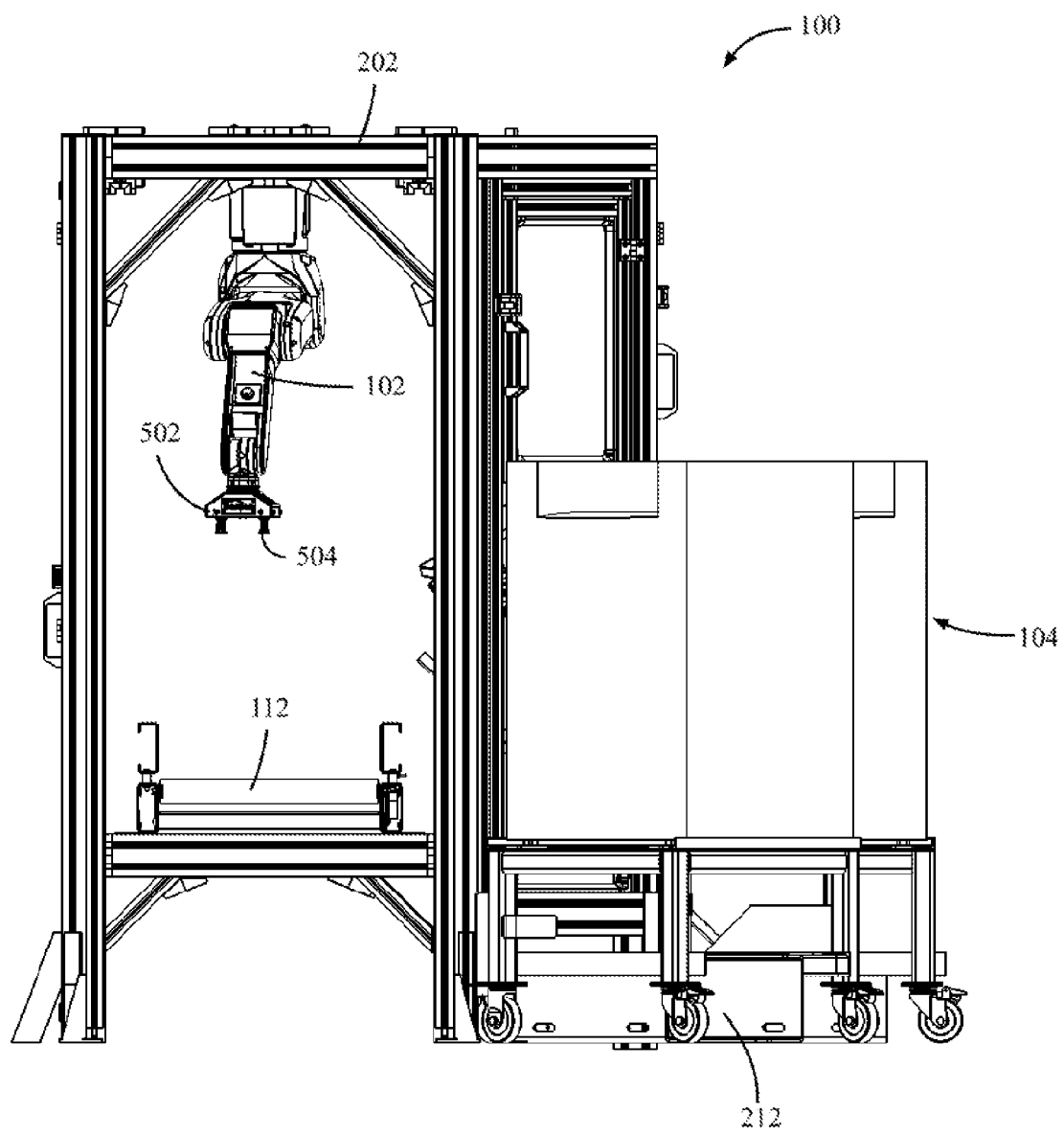
FIG. 5 is a side view of the FIG. 1 packing system.
Figure 6:
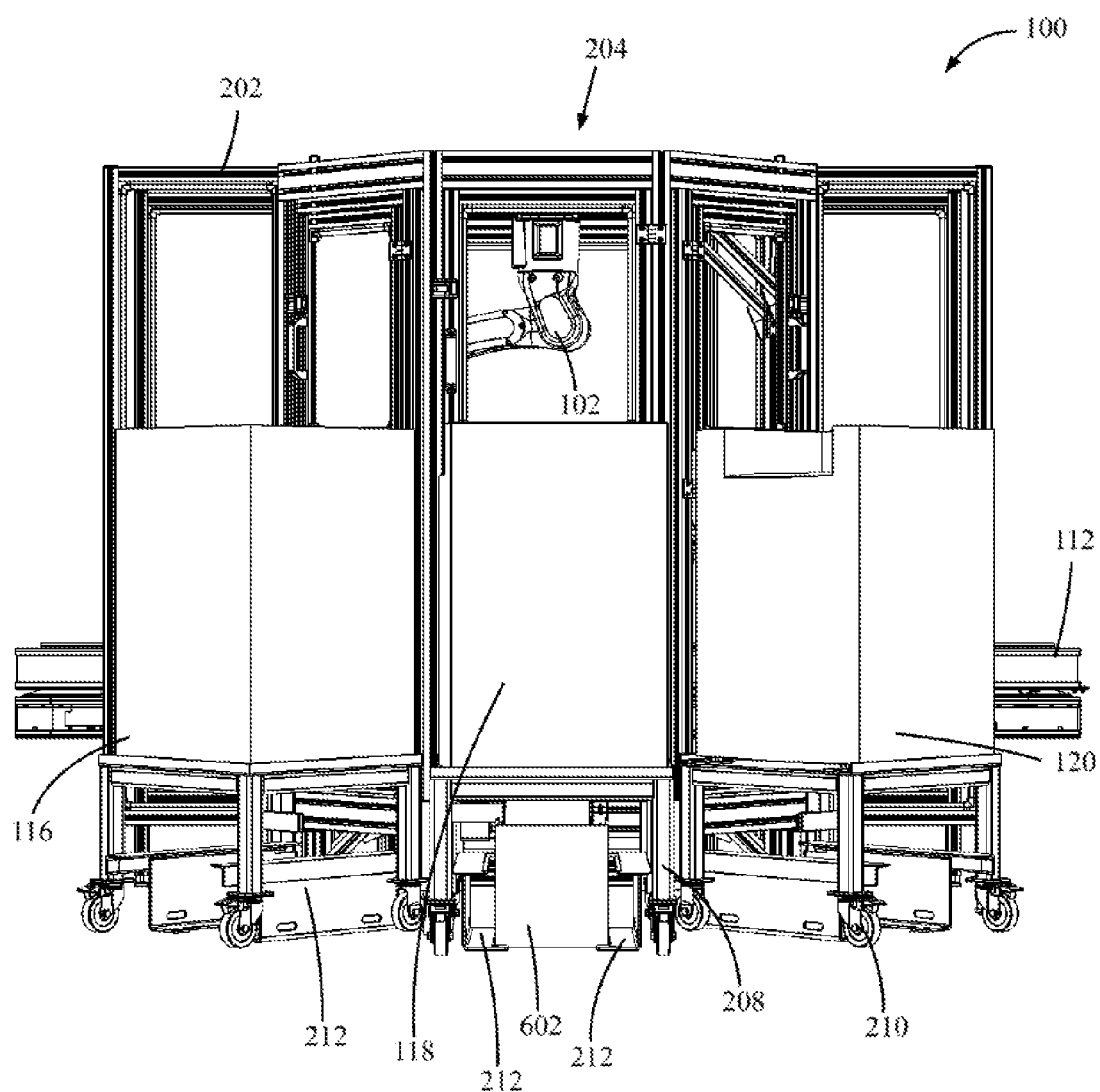
FIG. 6 is a front view of the FIG. 1 packing system.
Figure 7:
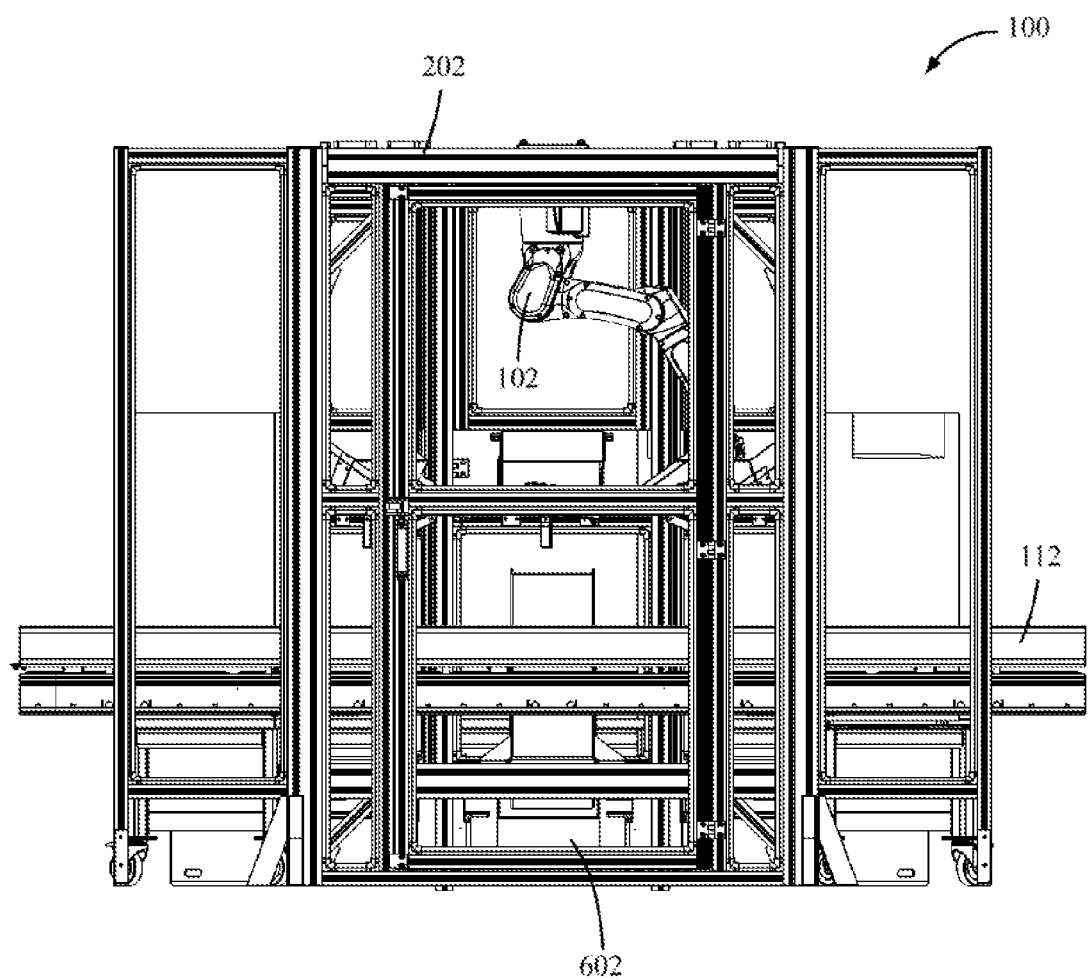
FIG. 7 is a back view of the FIG. 1 packing system.

Looking at FIG. 5, the robot arm 102 is again mounted in a vertical position from the support structure 202 such that the robot arm 102 is able to readily gain access to the boxes 114 on the conveyor 112. In one form, the robot arm 102 is a six-axis robot, but in other examples, the robot arm 102 can be configured differently, such as having more or less degrees of freedom of movement (e.g., fewer or more axes). The robot arm 102 includes an end of arm tool (EOAT) 502 for picking up the paper work from the trays 122 and placing the printed material into the boxes 114. In the illustrated example, the end of arm tool 502 includes one or more vacuum cups 504 that create a vacuum to hold the printed material in place against the EOAT 502. The EOAT 502 in other examples can include other types of mechanisms for picking up the printed material, such as impactive, ingressive, astrictive, and contiguitive type EOAT mechanisms.

Figure 8:
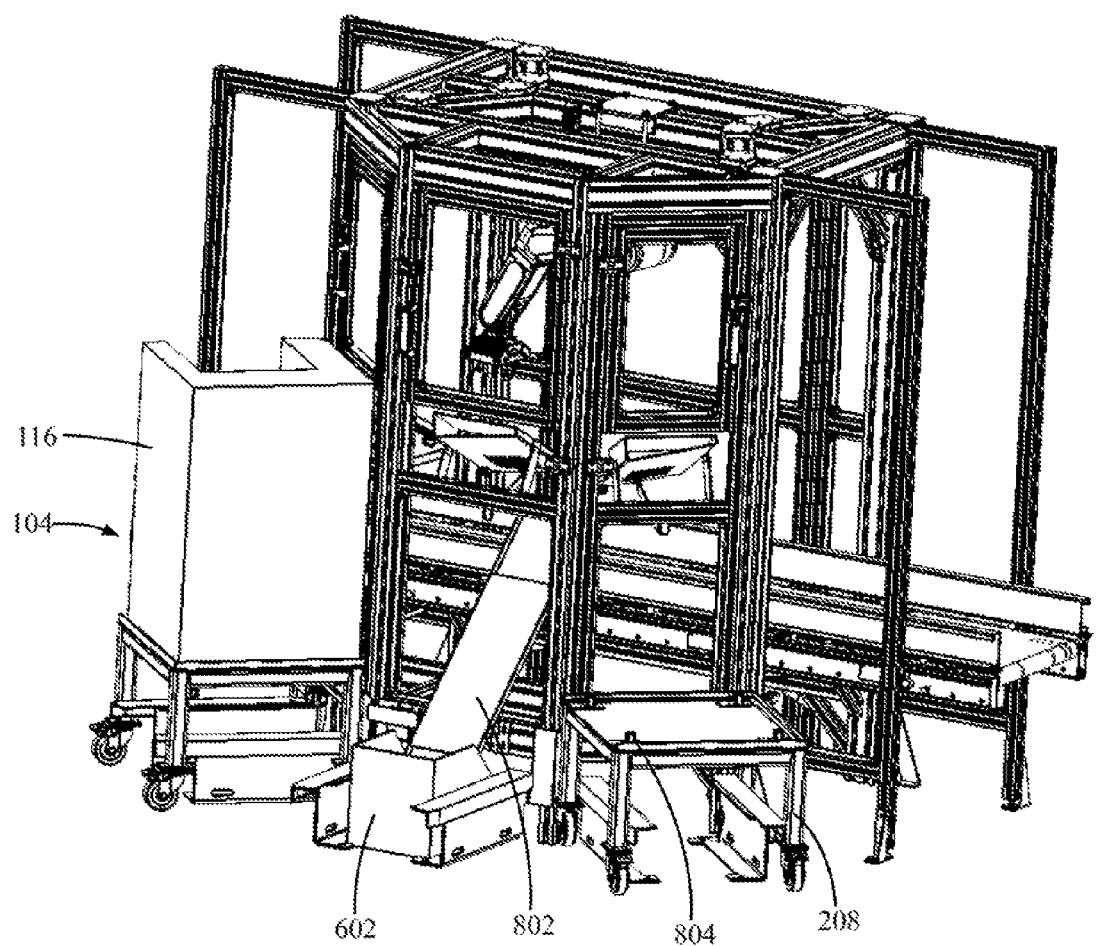
FIG. 8 is a perspective view of the FIG. 1 packing system in which selected printers have been removed.

Referring to FIGS. 6, 7, 8, and 9, the system 100 further includes a disposal or recycle bin 602 that allows the robot arm 102 to discard any printed material on an as-needed basis. The disposal bin 602 is positioned underneath the cart 208 for the second printer 118 in between the cart guide rails 212, but it should be recognized that the disposal bin 602 can be positioned elsewhere. FIG. 8 depicts a perspective view of the system 100 with the second printer 118 and corresponding cart 208 moved out of position so as to better visualize a disposal chute 802 that is used to guide the discarded paper into the disposal bin 602. As shown, the disposal chute 802 is angled so as to guide the paper into the disposal bin 602 via gravity. In other examples, the disposal chute 802 can include a powered conveyor so as to not rely on gravity to move the printed material into the bin 602. In addition, the third printer 120 in FIG. 8 has been removed from the cart 208 so that the top of the cart 208 can be better viewed. As can be seen, each cart 208 includes printer locating pins 804 located at the corners of the carts 208 so as to properly position and secure the printers 104 on the carts 208.

Figure 9:
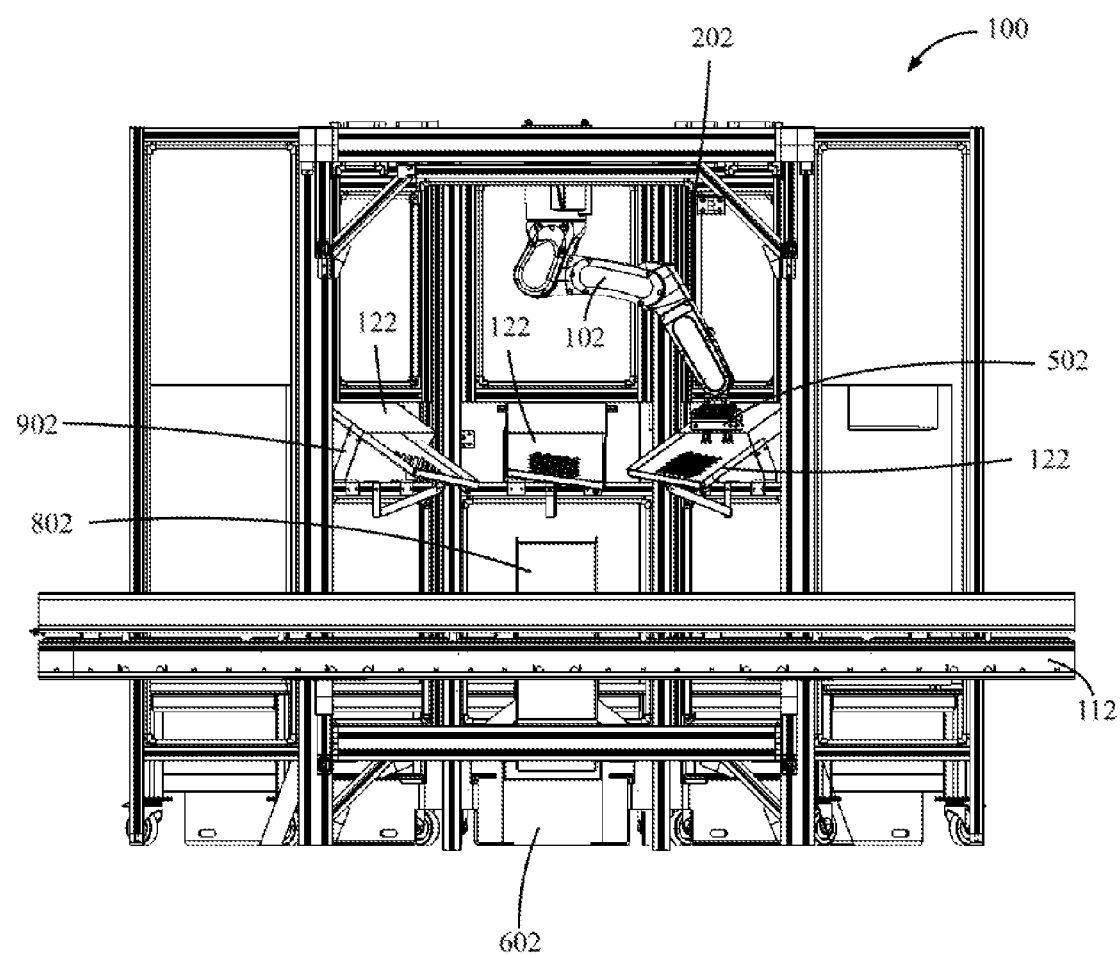
FIG. 9 is a front cross-sectional view of the FIG. 1 packing system in which a portion of the support structure has been removed.
Figure 10:
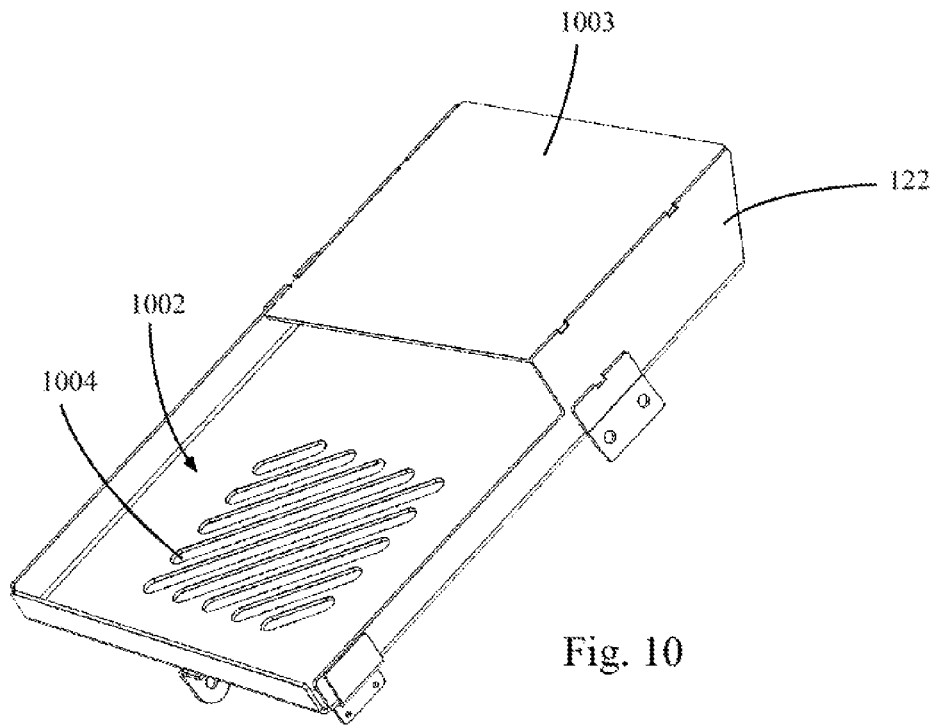
FIG. 10 is a front perspective view of a tray for the printers in the FIG. 1 packing system.
Figure 11:
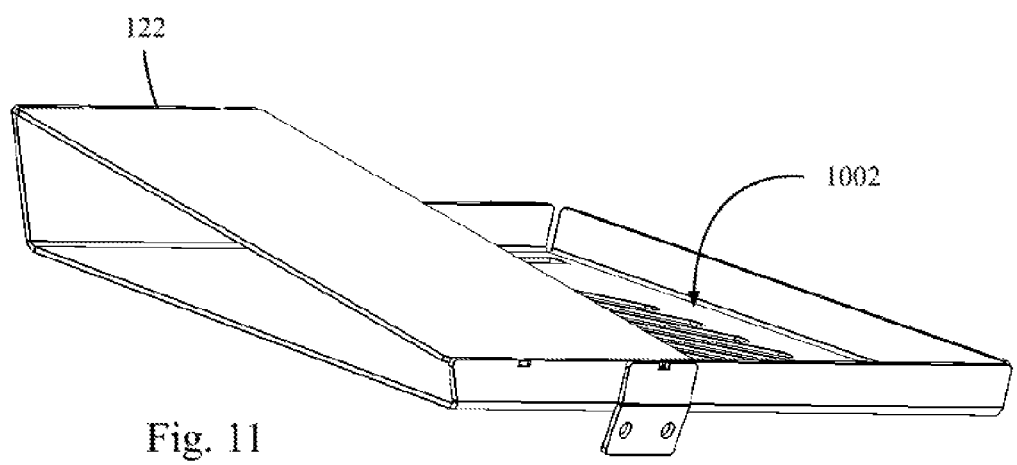
FIG. 11 is a rear perspective view of the FIG. 10 tray.
Figure 12:
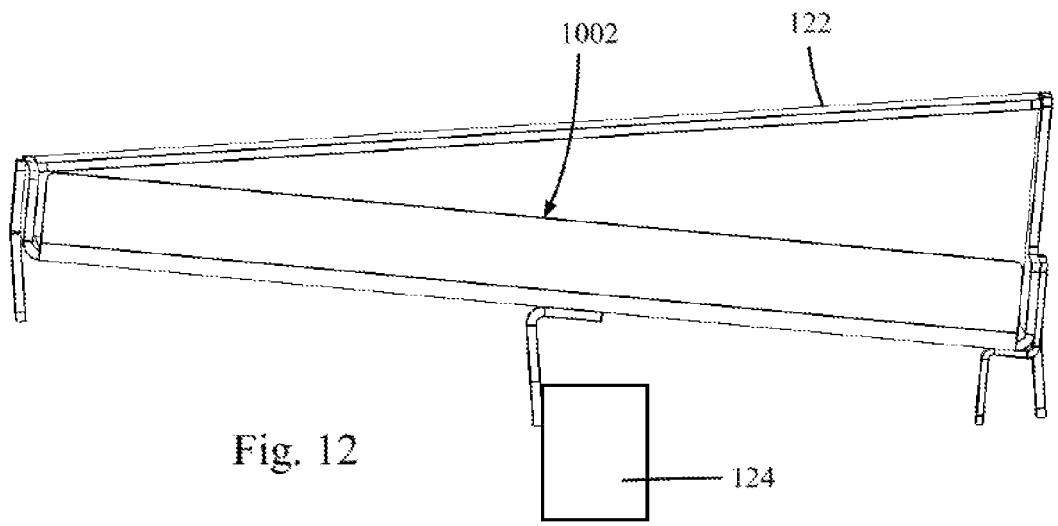
FIG. 12 is a front end view of the FIG. 10 tray.
Figure 13:
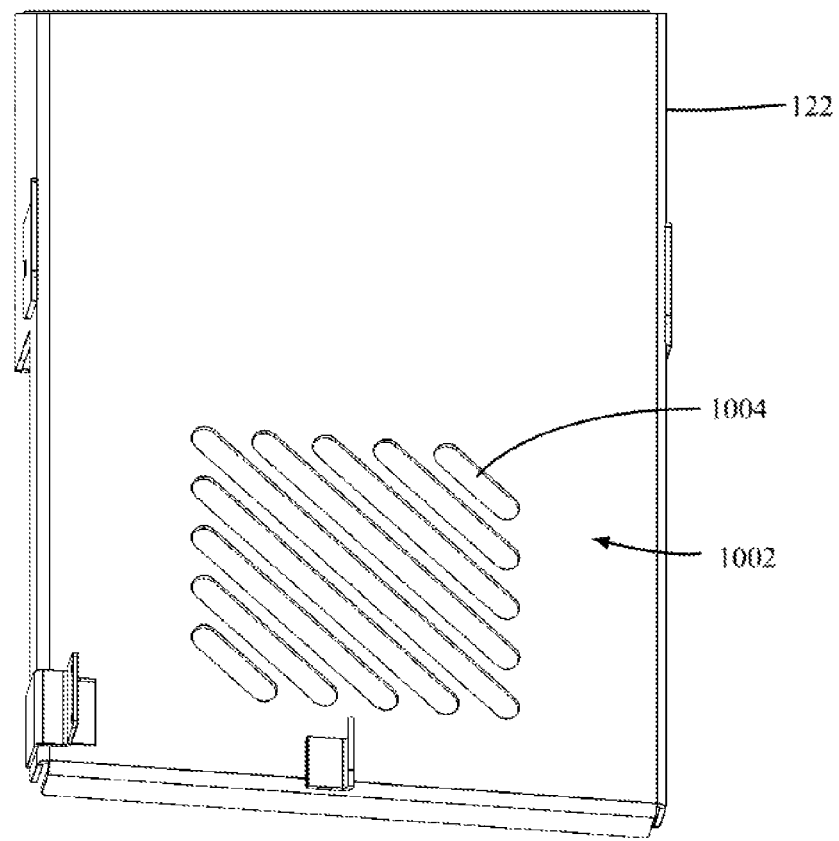
FIG. 13 is a bottom view of the FIG. 10 tray.

FIG. 9 illustrates a back view of the system 100 with a portion of the support structure 202 removed so as to better visualize the trays 122 as mounted to the support structure 202. As can be seen, the trays 122 are angled so that the printed material will naturally fall into one corner of the tray 122. Each tray 122 includes one or more mounting brackets 902 that secure the trays 122 to the support structure 202. The trays 122 are also located within the operational envelope of the robotic arm 102 such that the EOAT 502 is able to retrieve the printed material from the trays 122. FIGS. 10, 11, 12, and 13 respectively illustrate front perspective, rear perspective, end, and bottom views of the trays 122. The tray 122 includes a window portion 1002 that is configured to allow the tray sensor 124 to visually determine whether the printed material is properly positioned within the tray 122. The tray 122 further includes a cover portion 1003 that is positioned proximal to the printers 104 so as to ensure that the printed material properly drops into the tray 122. The cover portion 1003 can prevent various air currents or drafts (e.g., caused by robotic arm movement) from causing the paper to fall onto the floor. In the illustrated example, the window portion 1002 includes one or more slots 1004 defined in the tray 122. The window portion 1002 can be configured differently in other examples. For instance, the window portion 1002 can include a transparent section of material, such as transparent plastic, so that the sensor 124 is able to sense the printed material within the tray 122. As depicted in FIG. 12, the tray sensor 124 is positioned below the window portion 1002.

A technique for operating the packing system 100 will now be described with reference to FIGS. 1-9. One example of how the packing system 100 operates will now be described in one way, but it should be recognized that the system 100 can operate in a myriad of ways. Turning to FIG. 1, when the upstream sensor 126 reads the barcode on the box 114, the controller 105 either via internal data or external data from a remote warehouse data management system accessed through the network 108 determines the type, kind, color, content, and/or other properties of the printed material that needs to be deposited into the box 114. Depending on any number of factors, including but not limited to whether a particular printer 104 is being used and the printing requirements (e.g., whether color or black-and-white printing is required), the controller 105 identifies and selects one of the printers 104 in which to handle the print job. As noted before, having two or more printers 104 speeds up the throughput of the system. Moreover, the multiple printers 104 provide redundancy in case one fails.

The controller 105 sends the print job directly to the printer 104. To help speed up throughput and maintain printing speeds, the controller 105 of the system 100 prints the jobs directly to the print utility in the designated printer 104 and does not send the print jobs to any type of buffer. This instantly reduces any lag during printing. Instead of the 15 seconds lag time found in the prior designs, this current design allows for a 3 second lag time, which allows for just two or three boxes, to be queued. At the same time the printer 104 is printing the required printed material, the conveyor 112 moves the box 114 towards the work cell 204. At the entrance to the cell 204, the cell sensor 128 reads the barcode on the box 114 to confirm the identity of the box 114. At each printer tray 122 the tray sensor 124 scans the printed material to make sure it is appropriate; likewise, there is a cell sensor 128 at the infeed of the conveyor 112 identifies the proper box or other container 114. Alternatively or additionally, the robot sensor 130 can be used to scan both the printed material and the box 114. With the design of the system 100, the queue of boxes 114 is significantly shorter. Moreover, having the printed material directly picked from the printers 104 reduces the risk of any downtime or damage to the printed material because no extraneous belts or other feeding mechanisms are required. Before or once the box 114 is placed into position, the robot arm 102 picks the appropriate printed material from the tray 122 of the designated printer 104. As noted before, the tray sensor 124 detects whether the printed material is in the proper position within the tray 122 and/or otherwise damaged. If for example the printed material is misprinted, damaged, and/or improperly located within the tray 122, the robot arm moves the printed material and disposes of it by placing it in the disposal chute 802 which in turn transports the printed material into the disposal bin 602. When the printed material is properly positioned and in good shape, the EOAT 502 of the robot arm 102 picks up the printed material and places it into the box 114. Subsequently, the conveyor moves the box 114 now loaded with the printed material out of the work cell 204 such that other boxes 114 can be processed in a similar fashion as described above. Once downstream from the work cell 204, the box 114 can be manually sealed or automatically sealed with an automatic sealing machine, such as an automatic tape machine. In another variation, the robotic arm 102 is used to seal the box 114.

If any failure occurs, resolution of the problem is simplified because the entire conveyor line does not have to be emptied. Again, the design of the system 100 reduces the queue of boxes 114 to about two or three boxes 114 total. Moreover, the system 100 has reprint capabilities—if the printer 104 has an issue with printing the printed material, the robot arm 112 can pick up the printed material and place it into the recycle bin 602 located among the printers 104. By having three printers, one of the printers 104 can be taken off-line if for example a cartridge needs to be replaced without significantly impacting throughput. When a bad piece of paper is printed, the robot arm 112 removes it and places it in the recycle bin 602 via the disposal chute 802 and the paper can be reprinted at the current printer 104 or, if there is an issue with the printer 104, can be printed at one of the other printers 104. It should be appreciated this system 100 can provide greater flexibility in handling errors. In addition, the I/O device 106 of the system 100 allows a human operator to manually (or automatically) reassign jobs and monitor the pending queue. The boxes 114 can be monitored upstream so that the controller 105 can prioritize and assign jobs to specific printers 104 once the box 114 enters the printing area. Moreover, when any problems occur, the operator can reassign jobs and reprint using a simple drag-and-drop technique. It also allows for dynamic recovery.

Figure 14:
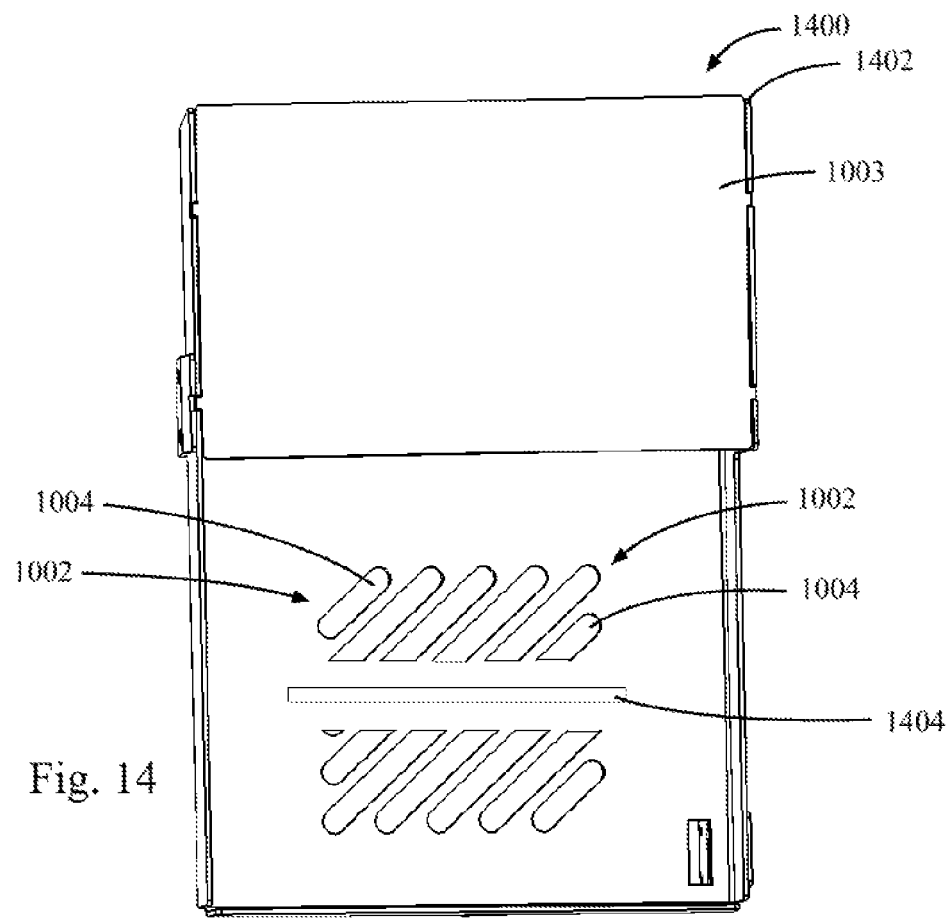
FIG. 14 is a top view of a tray that is used in the FIG. 1 packing system for folding the printed material.

Some printed material is naturally larger than the box or container 114 in which it is placed. For instance, some packing envelopes and boxes for tinier items tend to be smaller than standard paper sizes. In order to fit the printed material into such small envelopes, manual human labor is typically required in order to fold the printed material before being placed in an envelope or other small container 114. A unique paper folding system 1400 that facilitates automatic folding of the printed material and placing it into the box 114 will now be described with reference to FIGS. 14-17. As shown in FIG. 14, the folding system 1400 includes a unique tray 1402. The tray 1402 includes a number of features in common with the tray 122 described above. For example, the tray 1402 includes a window portion 1002, cover 1003, and slots 1004 of the type described above. For the sake of clarity as well as brevity, these common features will not be described in detail below, but reference is made to the previous discussion of these features. As can be seen, the tray 1402 includes a first (or transverse) folding slot 1404 that is defined in the tray 1402.

Figure 15:
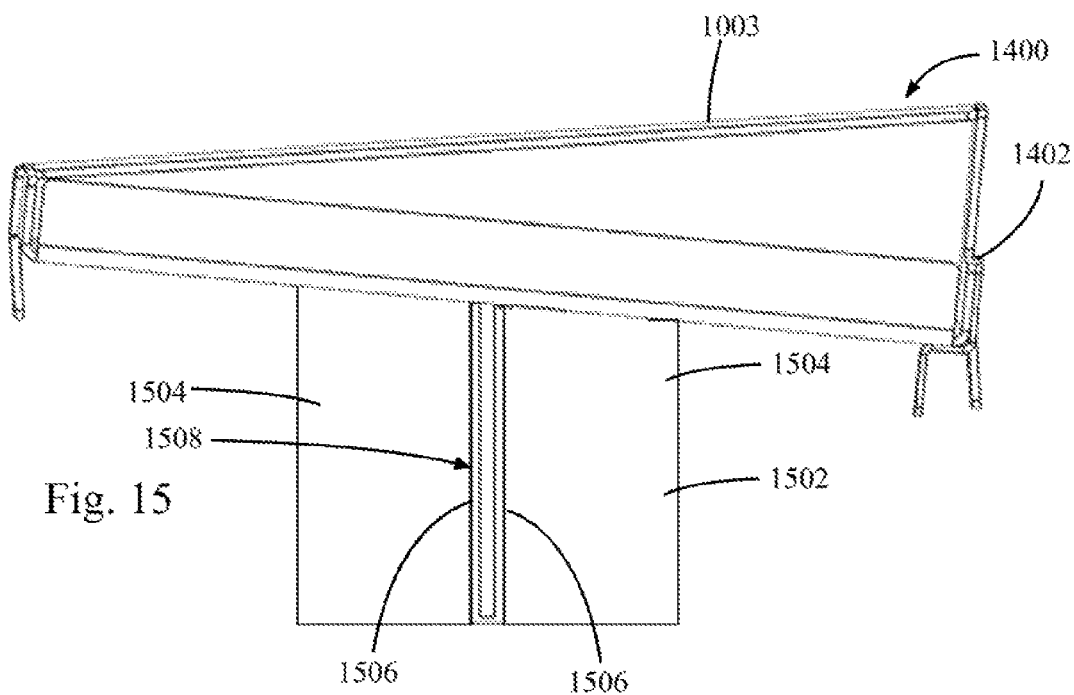
FIG. 15 is a front end view of the FIG. 14 tray.

Below the tray 1402, the tray 1402 includes a folding structure 1502 that aids in folding the printed material. The folding structure 1502 include transverse folding walls 1504 that are aligned with the transverse folding slot 1404 so as to extend the folding slot 1404 below the main portion of the tray 1402. Extending transverse to the folding walls 1504 (or perpendicular to them in the illustrated example), the folding structure 1502 includes folding walls 1506 that define a longitudinal slot 1508, as is shown in FIG. 15.

Figure 16:
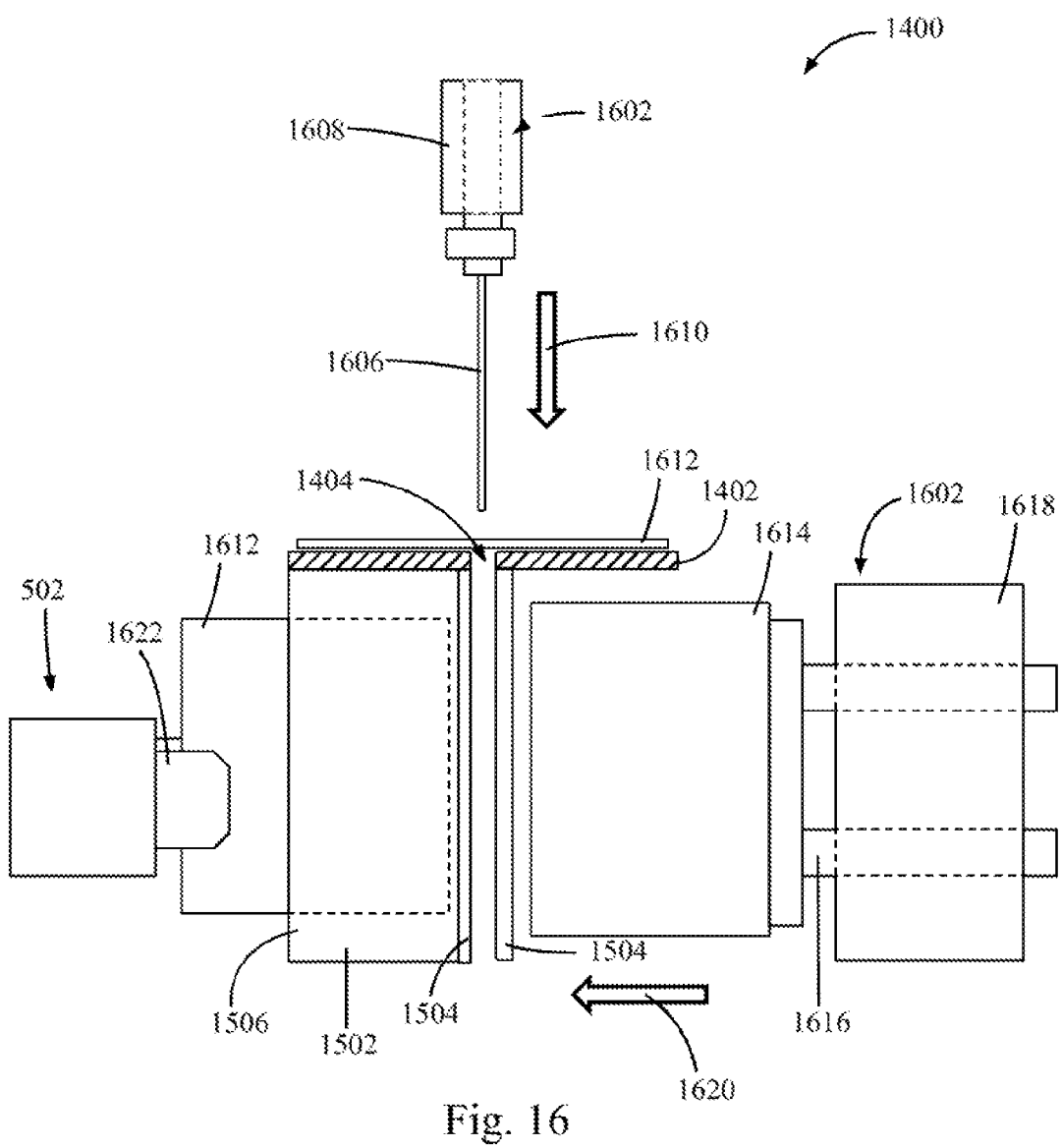
FIG. 16 is a cross-sectional view of a paper folding system that incorporates the FIG. 14 tray.
Figure 17:
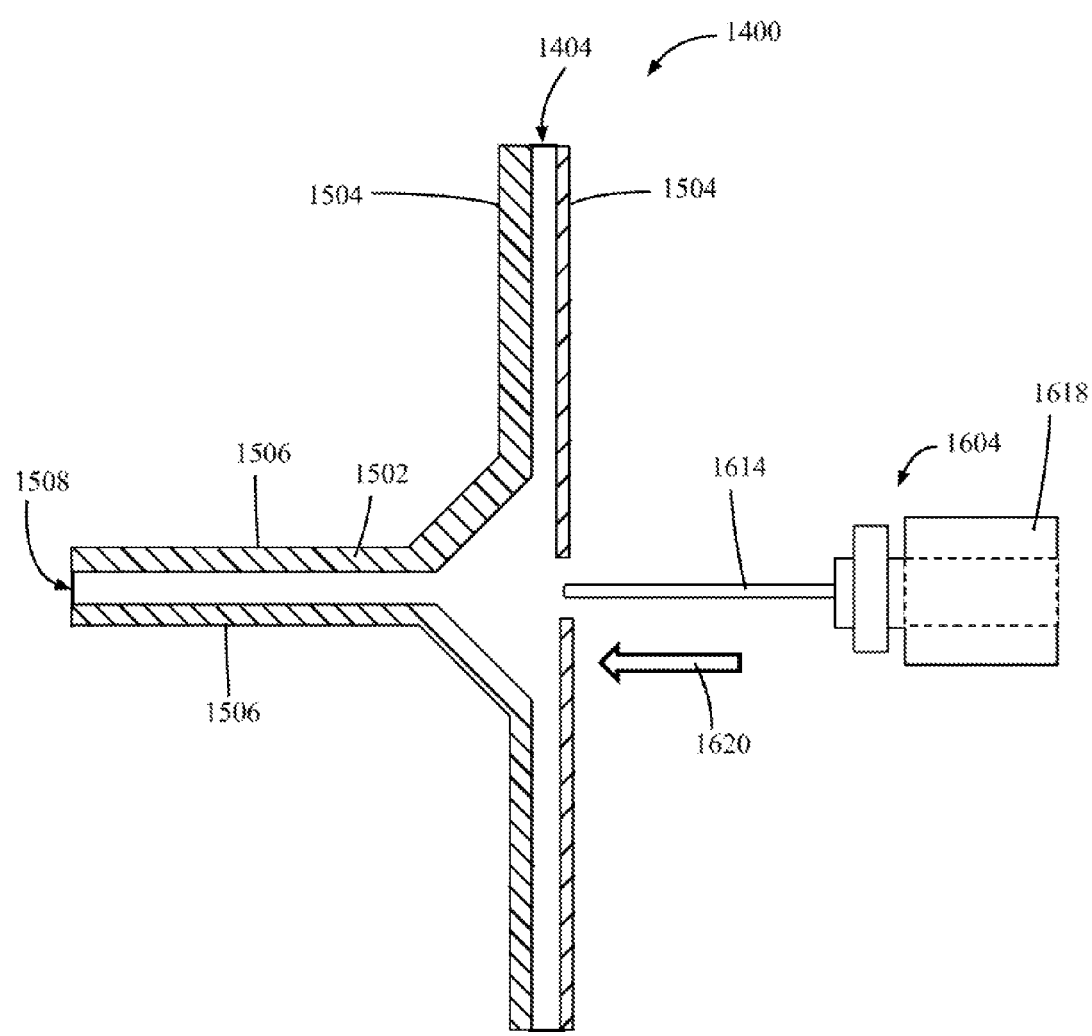
FIG. 17 is another cross-sectional view of the FIG. 16 paper folding system.

FIG. 16 shows a partial cross-sectional side view of the folding system 1400, and FIG. 17 shows a partial, top cross-sectional view of the folding system 1400 for folding one or more sheets of printer paper at the same time. The folding system 1400 includes a first, transverse fold blade system 1602 and a second, longitudinal fold blade system 1604. In one form, the blade systems 1602, 1604 are integrated into the EOAT 502 of the robotic arm 102, but in other examples, the blade systems 1602, 1604 are separate units from the robotic arm 102. The first folding blade system 1602 includes a first fold blade 1606 that is actuated by a first blade actuator 1608. The first fold blade 1606 has a generally rectangular shape with rounded edges, but the first fold blade 1606 can be shaped differently in other examples, depending on the folding needs. The first fold blade actuator 1608 in one form includes a pneumatic actuator, but it is envisioned in other examples that other types of actuators, such as hydraulic and/or electric actuators, can be used. As indicated by arrow 1610 in FIG. 16, the first actuator 1608 extends the first blade 1606 into the first, transverse folding slot 1404 in the tray 1402 so as to create a first fold in printed material 1612 that was printed by the printer 104. After the blade 1606 is fully extended, the first blade actuator 1608 is retracted in an opposite direction.

The second, longitudinal blade system 1604 includes a second, longitudinal blade 1614, one or more actuator rods 1616, and a second blade actuator 1618. The actuator rod 1616 connects the second, longitudinal blade 1614 to the second blade actuator 1618. The second blade 1614 has a generally rectangular shape that can be rounded, but in other examples, the blade 1614 can be shaped differently depending on the folding needs. The second fold blade actuator 1618 in one form includes a pneumatic actuator, but it is envisioned in other examples, that other types of actuators, such as hydraulic and/or electric actuators, can be used.

Looking at FIGS. 16 and 17, the second blade actuator 1618 extends the second, longitudinal blade 1614 into the longitudinal slot 1508 that is defined between the longitudinal folding walls 1506, as is indicated by arrow 1620. The second longitudinal blade 1614 pushes the folded paper 1612 such that the paper 1612 extends from the longitudinal slot 1508 of the folding structure 1502. Afterwards, the second blade actuator 1618 retracts the second blade 1614. The folded printed material 1612 is grasped by the EOAT 502 of the robot arm 102, which in this case is in the form of a pincher-type EOAT 1622. The jaws of the pincher-type EOAT 1622 grip the folded paper 1612 and place the paper 1612 into the appropriate box 114. In the illustrated example, the paper 1612 is folded twice, but in other examples, the paper 1612 can be folded only once or more than two times so that the paper 1612 can be fitted into the appropriately sized box 114.

Figure 18:
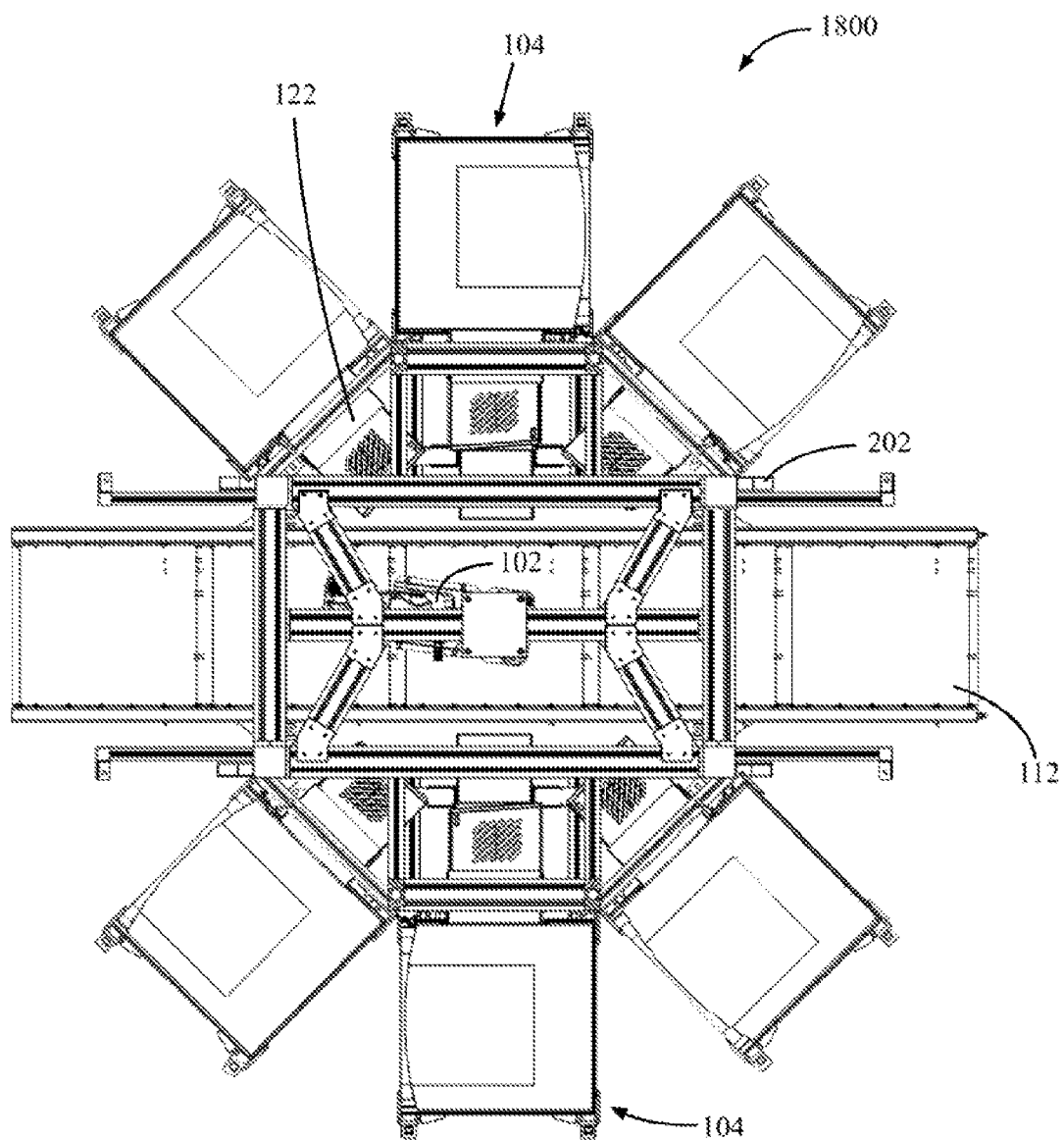
FIG. 18 is a top view of a packing system in which printers are positioned on both sides of a conveyor.
Figure 19:
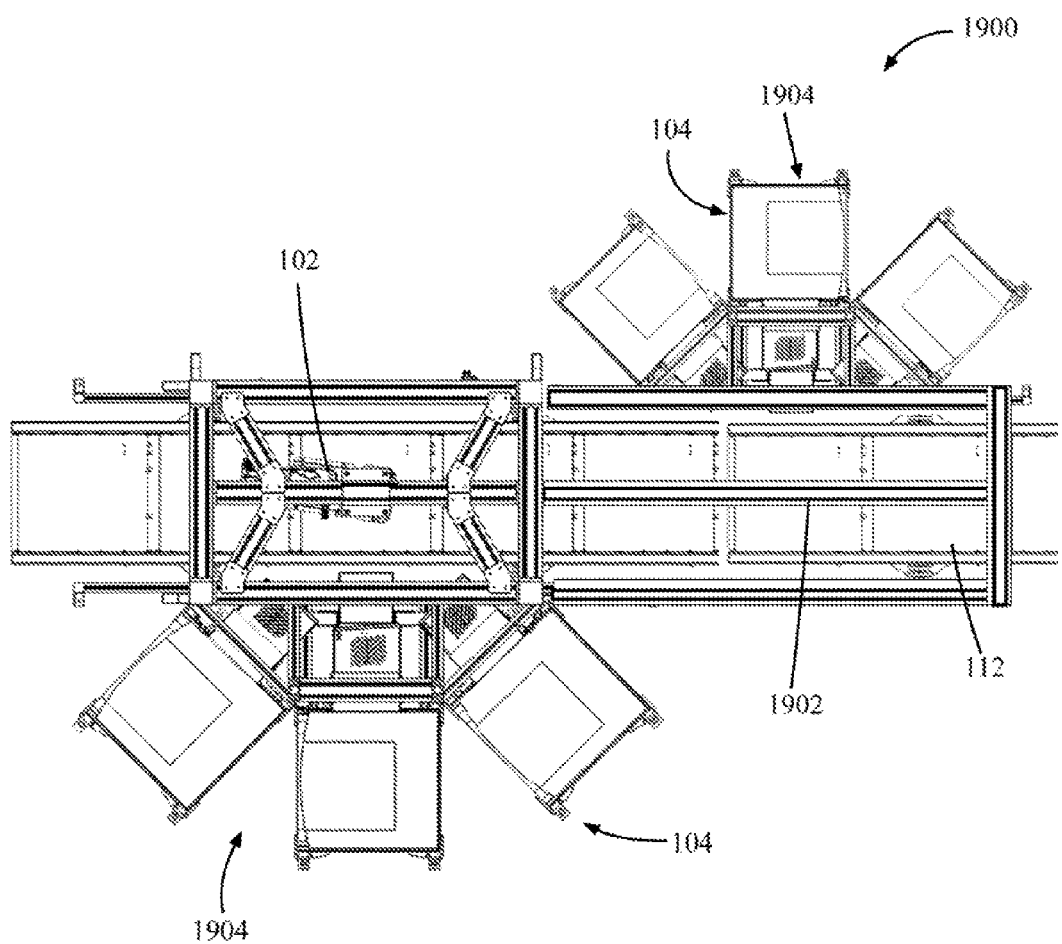
FIG. 19 is a top view of a packing system that incorporates a gantry that allows a robotic arm to move to multiple locations along a conveyor.
Figure 20:
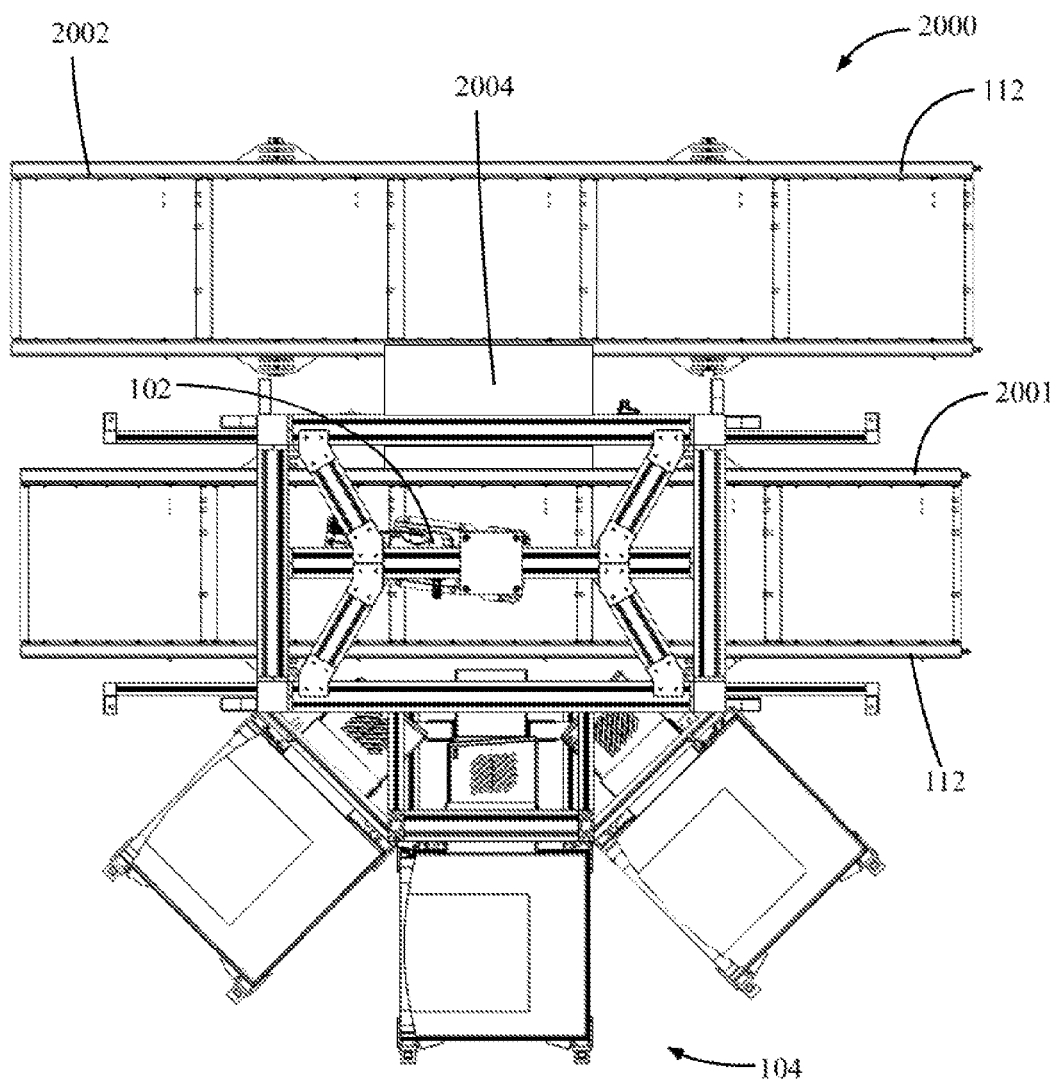
FIG. 20 is a top view of a packing system that incorporates a secondary conveyor onto which boxes can be diverted.

FIGS. 18, 19, and 20 show top views of various alternative designs or layouts for the packing system. As will be seen, these alternative designs share a number of features in common with the previously discussed designs, so for the sake of clarity as well as brevity, these common features will not be discussed in detail below but reference is made to the previous discussion of these common features. In packing system 1800 of FIG. 18, the printers 104 are located on both sides of the conveyor 112. This packing system 1800 provides greater throughput and flexibility in packing the printed material. For instance, different types of printers (e.g., black-and-white and color printers) can be used without detrimentally impacting throughput. As can be seen, the printers 104 are oriented in a circular arrangement such that the robotic arm 102 is able to readily retrieve the printed paperwork from the trays 122 of each of the printers 104 with less wasted movement.

FIG. 19 depicts a packing system 1900 in which the robotic arm 102 is movably mounted onto a gantry 1902. As shown, the printers 104 are organized in separate printer pods 1904 that are located on opposite sides of the conveyor 112 and longitudinally offset from one another along the conveyor 112. The gantry 1902 allows the robotic arm 102 to move along the conveyor 112 so as to gather and deposit into the boxes 114 printed material from each of the printer pods 1904. The design of the packing system 1900 in FIG. 19 provides further packing flexibility and productivity. This configuration can be especially useful in such situations as color printing where it takes longer for the printed material to print.

FIG. 20 shows a packing system 2000 that includes a primary conveyor 2001 that handles normal case flow and a secondary conveyor 2002 for handling rejects or other issues. As shown, a transfer conveyor 2004 extends between the primary conveyor 2001 and the secondary conveyor 2002. When the controller 105 (FIG. 1) detects an issue with one of the boxes 114 and/or packed printed material inside the box 114, the robotic arm 102 pushes or otherwise diverts the box 114 onto the transfer conveyor 2004 such that the box 114 is transferred between the conveyors 112. When on the secondary conveyor 2002, the box 114 can be repackaged or dealt with in some other way and/or recirculated back onto the primary conveyor 2001.

Glossary of Terms

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to the following terms or common variations thereof:

Barcode—generally refers to a visible arrangement of shapes, colors, lines, dots, or symbols fixed in some medium and arranged on the medium in a pattern configured to encode data. Examples include optical machine-readable representations of data relating to an object to which the barcode is attached such as a Universal Produce Code (UPC), or any visible patterns related to any type of Automatic Identification and Data Capture (AIDC) system. Another example of a barcode is a Quick Response Code (QR Code) which arranges various light and dark shapes to encode data. Any suitable medium is envisioned. Examples include an adhesive label, a physical page, a display device configured to display the barcode, or any other object such as a box, a machine, or other physical structure to which the barcode is affixed or upon which it is printed. For example, a bar code may be etched into metal, machined into plastic, or formed by organizing visible three-dimensional shapes into a pattern. The barcode may not be visible to humans but may be fixed using a substance or device that allows the barcode to be visible to sensors in a machine configured to read wavelengths of light outside those detectable by the human eye. Examples of this type of barcode include barcodes printed with ink that is only visible under ultraviolet (i.e. "black") light, or barcodes displayed using infrared light.

Container—generally refers to an object creating a partially or fully enclosed space that can be used to contain, store, and transport objects, items, and/or materials. In other words, a container can include an object that can be used to hold or transport something. By way of nonlimiting examples, containers can include boxes, totes, bags, jars, envelopes, barrels, cans, bottles, drums, and/or packages.

Controller—generally refers to a device, using mechanical, hydraulic, pneumatic electronic techniques, and/or a microprocessor or computer, which monitors and physically alters the operating conditions of a given dynamical system. In one nonlimiting example, the controller can include an Allen Bradley brand Programmable Logic Controller (PLC). A controller may include a processor for performing calculations to process input or output. A controller may include a memory for storing values to be processed by the processor, or for storing the results of previous processing. A controller may also be configured to accept input and output from a wide array of input and output devices for receiving or sending values. Such devices include other computers, keyboards, mice, visual displays, printers, industrial equipment, and systems or machinery of all types and sizes. For example, a controller can control a network or network interface to perform various network communications upon request. The network interface may be part of the controller, or characterized as separate and remote from the controller. A controller may be a single, physical, computing device such as a desktop computer, or a laptop computer, or may be composed of multiple devices of the same type such as a group of servers operating as one device in a networked cluster, or a heterogeneous combination of different computing devices operating as one controller and linked together by a communication network. The communication network connected to the controller may also be connected to a wider network such as the internet. Thus a controller may include one or more physical processors or other computing devices or circuitry, and may also include any suitable type of memory. A controller may also be a virtual computing platform having an unknown or fluctuating number of physical to processors and memories or memory devices. A controller may thus be physically located in one geographical location or physically spread across several widely scattered locations with multiple processors linked together by a communication network to operate as a single controller. Multiple controllers or computing devices may be configured to communicate with one another or with other devices over wired or wireless communication links to form a network. Network communications may pass through various controllers operating as network appliances such as switches, routers, firewalls or other network devices or interfaces before passing over other larger computer networks such as the internet. Communications can also be passed over the network as wireless data transmissions carried over electromagnetic waves through transmission lines or free space. Such communications include using WiFi or other Wireless Local Area Network (WLAN) or a cellular transmitter/receiver to transfer data.

Conveyor—is used in a broad sense to generally refer to a mechanism that is used to transport something, like an item, box, container, and/or SKU. By way of nonlimiting examples, the conveyor can include belt conveyors, wire mesh conveyors, chain conveyors, electric track conveyors, roller conveyors, cross-belt conveyors, vibrating conveyors, and skate wheel conveyors, to name just a few. The conveyor all or in part can be powered or unpowered. For instance, sections of the conveyors can include gravity feed sections.

Gantry—generally refers to a frame or other structure raised on supports so as to span over, around, and/or into something. The supports and frame structure can come in many forms. For instance, the supports can be independent structures or incorporated to form a unitary structure. By way of a non-limiting example, the supports can be incorporated into the structure of the building in which the gantry normally resides.

Input/Output (I/O) Device—generally refers to any device or collection of devices coupled to a computing device that is configured to receive input and deliver the input to a processor, memory, or other part of the computing device and/or is controlled by the computing device to produce an output. The I/O device can include physically separate input and output devices, or the input and output devices can be combined together to form a single physical unit. Such input devices of the I/O device can include keyboards, mice, trackballs, and touch sensitive pointing devices such as touchpads, or touchscreens. Input devices also include any sensor or sensor array for detecting environmental conditions such as temperature, light, noise, vibration, humidity, and the like. Examples of output devices for the I/O device include, but are not limited to, screens or monitors displaying graphical output, a projecting device projecting a two-dimensional or three-dimensional image, or any kind of printer, plotter, or similar device producing either two-dimensional or three-dimensional representations of the output fixed in any tangible medium (e.g. a laser printer printing on paper, a lathe controlled to machine a piece of metal, or a three-dimensional printer producing an object). An output device may also produce intangible output such as, for example, data stored in a database, or electromagnetic energy transmitted through a medium or through free space such as audio produced by a speaker controlled by the computer, radio signals transmitted through free space, or pulses of light passing through a fiber-optic cable.

Item or Stock Keeping Unit (SKU)—is used in a broad sense to generally refer to an individual article or thing. The item can come in any form and can be packaged or unpackaged. For instance, items can be packaged in cases, cartons, bags, drums, containers, bottles, cans, pallets, and/or sacks, to name just a few examples. The item is not limited to a particular state of matter such that the item can normally have a solid, liquid, and/or gaseous form for example.

Printed Material—generally refers to one or more sheets or pieces of material onto which information, such as text and/or images, is printed via a printer. The printed material, typically but not always, has one or more paper sheets acting as a substrate upon which the information is printed. Substrates made from materials different from paper, such as plastic, linen or *papyrus*, can be used instead. By way of non-limiting examples, the printed material can include invoices, bills of lading, receipts, manuals, sales information, catalogs, cards, and other types of paperwork or printed matter.

Printer—generally refers to a machine that makes a persistent human readable representation of graphics and/or text on paper or similar physical media, such as for example one linked to a computer or other electronic device. Common printer designs include black and white laser printers and color inkjet printers. By way of nonlimiting examples, the printer can include toner-based type printers, solid ink type printers, dye-sublimation type printers, inkless type printers, impact type printers, line type printers, electrostatic type printers, and/or plotters.

Robotic arm or robot arm—generally refers to a type of mechanical arm, usually programmable, with similar functions to a human arm. Links of the robot arm are connected by joints allowing either rotational motion (such as in an articulated robot) or translational (linear) displacement. The robot arm can have multiple axes of movement. By way of nonlimiting examples, the robot arm can be a 4, 5, 6, or 7 axis robot arm. Of course, the robot arm can have more or less axes of movement or freedom. Typically, but not always, the end of the robot arm includes a manipulator that is called an "end of arm tool" (EOAT) for holding, manipulating, or otherwise interacting with the items or other objects. The EOAT can be configured in many forms besides what is shown and described herein.

Sensor—generally refers to an object whose purpose is to detect events and/or changes in the environment of the sensor, and then provide a corresponding output. Sensors include transducers that provide various types of output, such as electrical and/or optical signals. By way of nonlimiting examples, the sensors can include pressure sensors, ultrasonic sensors, humidity sensors, gas sensors, motion sensors, acceleration sensors, displacement sensors, force sensors, optical sensors, and/or electromagnetic sensors. In some examples, the sensors include barcode readers, RFID readers, and/or vision systems.

It should be noted that the singular forms "a", "an", "the", and the like as used in the description and/or the claims include the plural forms unless expressly discussed otherwise. For example, if the specification and/or claims refer to "a device" or "the device", it includes one or more of such devices.

It should be noted that directional terms, such as "up", "down", "top" "bottom", "lateral", "longitudinal", "radial", "circumferential", etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

The invention claimed is:

1. A packing system, comprising:
   a conveyor configured to transport one or more containers;
   two or more printers disposed along the conveyor configured to print printed material, wherein each of the printers has a tray upon which the printed material is deposited from the printer;
   a robotic arm disposed proximal to the conveyor and the printers, wherein the robotic arm has an end of arm tool configured to pick the printed material from the tray of each printer; and
   a controller operatively connected to the printers and the robotic arm, wherein the controller is configured to send one or more print instructions to one or more of the printers to print the printed material, wherein the controller is configured to instruct the robotic arm to place the printed material from the tray into one of the one or more containers.

2. The system of claim 1, wherein the robotic arm is mounted in an inverted orientation above the conveyor.

3. The system of claim 2, wherein the conveyor is configured to index the containers below the robotic arm.

4. The system of claim 2, further comprising:
   a support structure from where the robotic arm hangs.

5. The system of claim 4, wherein:
   the printers are located at different areas along the conveyor;
   the support structure includes a gantry that at least extends between the different areas along the conveyor; and
   the robotic arm is moveably mounted to the gantry, wherein the robotic arm is configured to move along the gantry between the different areas.

6. The system of claim 1, wherein the printers are oriented in an arc-shaped manner.

7. The system of claim 1, wherein the printers are located on opposite sides of the conveyor.

8. The system of claim 1, wherein the printers are disposed on carts that are configured to move.

9. The system of claim 8, further comprising one or more guide rails positioned to guide the carts into position for the robotic arm.

10. The system of claim 1, wherein the controller is configured to send one or more print jobs directly to a print utility for each printer to reduce any buffering of the print jobs at the printers to increase packing throughput of the containers.

11. The system of claim 1, wherein the tray includes a folding structure that defines one or more folding slots.

12. The system of claim 11, further comprising:
    one or more folding blade systems including a folding blade and a blade actuator configured to extend the folding blade into one of the folding slots.

13. The system of claim 1, further comprising:
    a secondary conveyor;
    a transfer conveyor extending between the conveyor and the secondary conveyor; and
    wherein the controller is configured to direct any deficient ones of the containers onto the secondary conveyor via the transfer conveyor.

14. The system of claim 13, wherein the robotic arm is configured to direct the deficient containers onto the transfer conveyor.

15. The system of claim 1, further comprising:
    a support structure supporting the robot arm; and
    wherein the tray is attached to the support structure so that the tray remains with the support structure when one of the printers associated with the tray is removed.

16. The system of claim 1, wherein the printers include three or more printers.

17. The system of claim 1, further comprising:
    a sensor operatively connected to the controller, wherein the sensor is positioned proximal to the tray to sense the printed material when in the tray.

18. The system of claim 17, wherein the controller is configured to reassign a print job to a different one of the printers when the sensor senses a deficiency in the printed material.

19. The system of claim 17, further comprising:
    a disposal bin; and
    wherein the controller is configured to instruct the robotic arm to place the printed material into the disposal bin when the sensor senses a deficiency in the printed material.

20. The system of claim 19, further comprising:
    a disposal chute extending from the disposal bin proximal to the robotic arm; and
    wherein the robotic arm is configured to place the printed material onto the disposal chute.

21. The system of claim 17, wherein the tray includes a window portion through which the sensor senses the printed material in the tray.

22. The system of claim 21, wherein the window portion includes one or more slots in the tray.

23. The system of claim 1, further comprising:
    a sensor operatively connected to the controller, wherein the sensor is located along the conveyor upstream from the robotic arm to identify the container before the printed material is placed in the container.

24. The system of claim 23, wherein the controller is configured to assign print jobs to one or more of the printers based on the identity of the container.

25. The system of claim 23, wherein the sensor includes a barcode reader.

26. The system of claim 23, further comprising:
    an input/output device operatively connected to the controller, wherein the input/output device is configured to provide a human interface to facilitate reassignment of print jobs.

* * * * *